United States Patent
Hayamizu et al.

(10) Patent No.: US 11,548,267 B2
(45) Date of Patent: Jan. 10, 2023

(54) HEAT CYCLE SYSTEM

(71) Applicant: AGC Inc., Chiyoda-ku (JP)

(72) Inventors: Hiroki Hayamizu, Chiyoda-ku (JP);
Masato Fukushima, Chiyoda-ku (JP);
Hirokazu Takagi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 455 days.

(21) Appl. No.: 16/285,257

(22) Filed: Feb. 26, 2019

(65) Prior Publication Data

US 2019/0186799 A1 Jun. 20, 2019

Related U.S. Application Data

(63) Continuation of application No. PCT/JP2017/030793, filed on Aug. 28, 2017.

(30) Foreign Application Priority Data

Aug. 29, 2016 (JP) .............................. JP2016-166703

(51) Int. Cl.
*G01N 21/88* (2006.01)
*B32B 17/10* (2006.01)
*F25B 1/00* (2006.01)
(Continued)

(52) U.S. Cl.
CPC ............... *B32B 17/10* (2013.01); *C09K 5/04* (2013.01); *F16L 55/24* (2013.01); *F25B 1/00* (2013.01);
(Continued)

(58) Field of Classification Search
CPC .............................................. G01N 21/8803
See application file for complete search history.

(56) References Cited

U.S. PATENT DOCUMENTS

| | | | |
|---|---|---|---|
| 4,856,289 A * | 8/1989 | Lofland | F25B 45/00 62/149 |
| 5,377,496 A | 1/1995 | Otto et al. | |
| 2004/0025532 A1* | 2/2004 | Scaringe | F25B 43/003 62/474 |

(Continued)

FOREIGN PATENT DOCUMENTS

| CN | 1401068 A | 3/2003 |
|---|---|---|
| CN | 103534328 A | 1/2014 |

(Continued)

OTHER PUBLICATIONS

Chen Zeen, anti-corrosion sight glass, CN-202943943-U, May 2013.*

(Continued)

*Primary Examiner* — Lisa M Caputo
*Assistant Examiner* — Alex T Devito
(74) *Attorney, Agent, or Firm* — Oblon, McClelland, Maier & Neustadt, L.L.P.

(57) ABSTRACT

A heat cycle system is a heat cycle system (1) using a working medium containing hydrofluoroolefin (HFO) that has a double bond in a molecule structure, the heat cycle system (1) having a compressor (10), a high-pressure side heat exchanger (12), a low-pressure side heat exchanger (14), an expansion mechanism (13), and an acid detection means (40) which is disposed in a discharge pipe (21) connecting the compressor (10) and the high-pressure side heat exchanger (12) and which detects acid generated by decomposition of the working medium in a heat cycle.

5 Claims, 4 Drawing Sheets

(51) Int. Cl.
  *C09K 5/04* (2006.01)
  *F25B 49/02* (2006.01)
  *F16L 55/24* (2006.01)
  *F25B 49/00* (2006.01)
(52) U.S. Cl.
  CPC ............ *F25B 49/005* (2013.01); *F25B 49/02* (2013.01); *C09K 5/045* (2013.01); *C09K 2205/126* (2013.01); *F25B 2347/00* (2013.01); *F25B 2500/04* (2013.01); *G01N 21/8803* (2013.01); *Y02P 20/10* (2015.11)

(56) References Cited

U.S. PATENT DOCUMENTS

| 2016/0347981 A1 | 12/2016 | Fukushima |
| 2017/0146284 A1 | 5/2017 | Matsunaga et al. |

FOREIGN PATENT DOCUMENTS

| DE | 41 15 664 A1 | 11/1992 | |
| EP | 1 256 768 A1 | 11/2002 | |
| JP | 60-187885 | 12/1985 | |
| JP | 6-313656 | 11/1994 | |
| JP | 7-225069 | 8/1995 | |
| JP | 9-4946 | 1/1997 | |
| JP | 2005-221231 | 8/2005 | |
| JP | 2007-292426 | 11/2007 | |
| JP | 2015-145452 | 8/2015 | |
| JP | 2015-200480 | 11/2015 | |
| JP | 2015-214927 A | 12/2015 | |
| WO | WO-2012157762 A1 * | 11/2012 | ............ C09K 5/044 |
| WO | WO 2015/125534 A1 | 8/2015 | |

OTHER PUBLICATIONS

International Search Report dated Nov. 14, 2017 in PCT/JP2017/030793 filed Aug. 28, 2017 (with English Translation).

Written Opinion dated Nov. 14, 2017 in PCT/JP2017/030793 filed Aug. 28, 2017.

Ngoc Anh Lai, "Thermodynamic Properties of HFO-1243zf and Their Application in Study on a Refrigeration Cycle", Applied Thermal Engineering, , vol. 70, XP29011047, 2014, pp. 1-6.

* cited by examiner

HEAT CYCLE SYSTEM

CROSS-REFERENCE TO RELATED APPLICATIONS

This application is a continuation of prior International Application No. PCT/JP2017/030793, filed on Aug. 28, 2017 which is based upon and claims the benefit of priority from Japanese Patent Application No. 2016-166703, filed on Aug. 29, 2016; the entire contents of all of which are incorporated herein by reference.

FIELD

The present invention relates to a heat cycle system using a working medium containing hydrofluoroolefin (HFO).

BACKGROUND

Conventionally, a hydrofluorocarbon (HFC)-based refrigerant has been widely used as a working medium in a heat cycle system such as a refrigerator, an air-conditioning apparatus, a power generating system (waste heat recovery power generation or the like), a secondary cooling apparatus, and a Rankine cycle. However, HFC has a high global warming potential (GWP) and a possibility of its causing global warming is pointed out. Accordingly, there is an urgent need to develop a working medium for heat cycle which has small influence on an ozone layer and has a small global warming potential. As the working medium for heat cycle which has small influence on the ozone layer and has small influence on global warming, one which contains hydrofluoroolefin (HFO) having a carbon-carbon double bond that is likely to be decomposed by OH radical in the atmosphere is studied. For example, Japanese Patent Publication JP-A 2015-145452 describes a heat cycle system using a working medium which contains 1,1,2-trifluoroethylene (HFO-1123).

SUMMARY

However, since HFO is a chemical compound which includes an unsaturated bond in a molecule and a chemical compound which is quite small in atmospheric lifetime, HFO is inferior in stability to saturated hydrofluorocarbon and hydrochlorofluorocarbon such as conventional HFC and HCFC, under a condition that compression and heating are repeated in a heat cycle. When these working media are decomposed, decomposition products such as acid exemplified by hydrogen fluoride or the like and carbon are sometimes generated. Existence of the decomposition products as above in the heat cycle may have an adverse effect on reliability of the heat cycle system. Thus, it is necessary to appropriately detect occurrence of decomposition of the working medium in the heat cycle when the working medium containing HFO is used for the heat cycle system.

The present invention is made in view of the above circumstances, and its object is to provide a heat cycle system capable of appropriately detecting occurrence of decomposition of a working medium in a heat cycle in the case where the working medium containing HFO is used.

The present invention is made in view of the above, and provides a heat cycle system having a following configuration.

[1] A heat cycle system using a working medium containing hydrofluoroolefin (HFO), the heat cycle system having: a compressor; a high-pressure side heat exchanger; a low-pressure side heat exchanger; an expansion mechanism; and an acid detector to detect acid generated by decomposition of the working medium, the acid detector being provided in a discharge pipe connecting the compressor and the high-pressure side heat exchanger.

[2] The heat cycle system according to [1], wherein the acid detector comprises a sight glass having an observation window to observe the working medium passing inside the discharge pipe, and in the observation window, at least a portion on a side to be in contact with the working medium is formed of glass.

[3] The heat cycle system according to [2], wherein the observation window is formed to have a larger thickness than a thickness necessary and sufficient to maintain pressure resistance performance.

[4] The heat cycle system according to [2], wherein, in the observation window, a portion on an opposite side to the side to be in contact with the working medium is formed of an acid-resistant transparent member.

[5] The heat cycle system according to any one of [2] to [4], wherein the sight glass is provided in a trap portion of the discharge pipe.

[6] The heat cycle system according to any one of [1] to [5], wherein the HFO contains 1,1,2-trifluoroethylene.

According to the present invention, it is possible to appropriately detect occurrence of decomposition of a working medium in a heat cycle in the case where a working medium containing HFO is used.

DETAILED DESCRIPTION

Hereinafter, an embodiment of the present invention will be described with reference to the drawings.

First, a working medium used in a heat cycle system of the present embodiment will be described.

<Working Medium>

(Hydrofluoroolefin (HFO))

The working medium used in the present embodiment contains hydrofluoroolefin (HFO). HFO can be also called HFC having a carbon-carbon double bond in a molecule structure, and examples of the HFO include 1,1,2-trifluoroethylene (HFO-1123), 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), trans- 1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)), 3,3,3-trifluoropropene (HFO-1243zf), and so on. As HFO, it is preferable to include HFO-1123, HFO-1234yf, HFO-1234ze(E) or HFO-1234ze(Z), and it is more preferable to include HFO-1123 or HFO-1234yf, and it is particularly preferable to include HFO-1123.

The working medium used in the present embodiment contains HFO, and further, may contain a later-described arbitrary component as necessary. A content of HFO in relation to 100 mass % of the working medium is preferably 10 mass % or more, more preferably 20 to 80 mass %, further preferably 40 to 80 mass %, and furthermore preferably 40 to 60 mass %.

Further, the working medium used in the present embodiment preferably contains HFO-1123. A content of HFO-1123 in relation to 100 mass % of the working medium is preferably 10 mass % or more, more preferably 20 to 80 mass %, further preferably 40 to 80 mass %, and furthermore preferably 40 to 60 mass %.

(HFO-1123)

A characteristic of HFO-1123 as the working medium will be listed in Table 1 in relative comparison between R410A (pseudoazeotropic mixture working medium of HFC-32 and HFC-125 with a mass ratio of 1:1) in particular. Cycle performance is expressed by a coefficient of performance and a refrigerating capacity obtained by later-described methods. The coefficient of performance and the refrigerating capacity of HFO-1123 are expressed as relative values (to be hereinafter referred to as "relative coefficient of performance" and "relative refrigerating capacity" respectively) using R410A as references (1.000). A global warming potential (GWP) is a value over 100 years described in the Intergovernmental Panel on Climate Change (IPCC) Fourth Assessment Report (2007), or measured according to that method. In this description, the GWP means this value unless otherwise stated. When the working medium is made of a mixture, a temperature glide becomes an important factor in evaluation of the working medium and its value is preferable to be smaller, as will be described later.

TABLE 1

|  | R410A | HFO-1123 |
| --- | --- | --- |
| Relative coefficient of performance | 1.000 | 0.921 |
| Relative refrigerating capacity | 1.000 | 1.146 |
| Temperature glide [° C.] | 0.2 | 0 |
| GWP | 2088 | 0.3 |

The working medium used in the present embodiment preferably contains HFO-1123 as described above, and further, may contain a chemical compound which is ordinarily used as a working medium other than HFO-1123 within a range not to impair the effect of the present invention. Examples of the chemical compound to be combined with HFO-1123 as above include, for example, HFC, HFO other than HFO-1123, other components that are vaporized or liquidized with HFO-1123 other than the above, and HFC and HFO other than HFO-1123 are preferable.

As the component to be used together, a chemical compound is preferable which has an action to further raise the above-described relative coefficient of performance and relative refrigerating capacity and can limit the GWP or the temperature glide within an acceptable range when that component is used in a heat cycle in combination with HFO-1123, for example. If the working medium contains such a chemical compound in combination with HFO-1123, better cycle performance can be obtained and influence by the temperature glide is small while the GWP is kept to be low.

(Temperature Glide)

When the mixture is used as the working medium, an azeotropic mixture or a pseudoazeotropic mixture such as R410A is preferably used ordinarily. A non-azeotropic composition has a problem of undergoing composition change when put into a refrigerating and air-conditioning apparatus from a pressure container. Further, when the working medium leaks out from the refrigerating and air-conditioning apparatus, a working medium composition in the refrigerating and air-conditioning apparatus is highly likely to change, resulting in difficulty in recovery of the working medium composition to an initial state. In the meantime, the above-described problems can be avoided if the azeotropic or pseudoazeotropic mixture is used.

As an index to measure applicability of the mixture to the working medium, the "temperature glide" is commonly employed. The temperature glide is defined as properties that an initiation temperature and a completion temperature differ from each other in a heat exchanger, for example, in evaporation in a low-pressure side heat exchanger or in condensation in a high-pressure side heat exchanger. The temperature glide of the azeotropic mixture is 0, and as for the pseudoazeotropic mixture, temperature glide is quite close to 0 (zero) as the temperature glide of R410A is 0.2, for example.

The case where the temperature glide is large is a problem because, for example, an inlet temperature of the low-pressure side heat exchanger decreases, to make frosting more likely to occur. Further, in the heat cycle system, in order to improve heat exchange efficiency, it is common to make the working medium flowing in a heat exchanger and a heat source fluid such as water or the air flow in counter-current flow, and the temperature difference of the heat source fluid is small in a stable operation state. Therefore, it is difficult to obtain a heat cycle system with good energy efficiency in the case of a non-azeotropic mixed medium with a large temperature glide. Accordingly, when the mixture is used as the working medium, a working medium with an appropriate temperature glide is desired.

When the working medium contains HFO-1123 and another working medium, for example, there is a tendency of having a comparatively large temperature glide except in the case where HFO-1123 and another working medium form an azeotropic composition. Since the temperature glide of the working medium varies depending on the kind of another working medium to be used together and a mixing ratio of HFO-1123 with another working medium, constant attention is required so as to keep the temperature glide within an appropriate range.

(HFC)

HFC being an arbitrary component is preferably selected from the above-described viewpoint. Here, HFC is known to be higher in GWP than HFO-1123 Therefore, HFC to be combined with HFO-1123 is preferably selected appropriately particularly from the viewpoint of keeping the GWP within an acceptable range, in addition to improving the cycle performance as the above-described working medium and keeping the temperature glide within an appropriate range.

As HFC having less influence on the ozone layer and having less influence on global warming, concretely, HFC with 1 to 5 carbon atoms is preferred. HFC may be linear, branched, or cyclic.

Examples of HFC include HFC-32, difluoroethane, trifluoroethane, tetrafluoroethane, HFC-125, pentafluoropropane, hexafluoropropane, heptafluoropropane, pentafluorobutane, heptafluorocyclopentane, and so on.

Among the above, as HFC, in terms of having less influence on the ozone layer and being excellent in heat cycle characteristic, HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), and HFC-125 are preferable, and HFC-32, HFC-152a, HFC-134a, and HFC-125 are more preferable.

As for HFC, one kind may be used independently, or two or more kinds may be used in combination.

The content of HFC in the working medium (100 mass %) can be selected arbitrarily in correspondence with a characteristic required of the working medium. In the case of a working medium formed of HFO-1123 and HFC-32, for example, a coefficient of performance and a refrigerating capacity improve when the content of HFC-32 is within a range of 1 to 99 mass %. In the case of a working medium formed of HFO-1123 and HFC-134a, the coefficient of performance improves when the content of HFC-134a is within a range of 1 to 99 mass %.

Further, the GWP of preferable HFC described above is 675 in the case of HFC-32 and 1430 in the case of HFC-134a, and 3500 in the case of HFC-125. In view of suppressing the GWP of the obtained working medium to be low, HFC-32 is most preferable as HFC being the arbitrary component.

Further, HFO-1123 and HFC-32 are capable of forming a pseudoazeotropic mixture close to an azeotropic mixture, when contained within a composition range of 99:1 to 1:99 in mass ratio, and a mixture thereof has a temperature glide of nearly 0 (zero) almost without regard to the composition range. Also from this viewpoint, HFC-32 is advantageous as HFC to be combined with HFO-1123.

As for the working medium used in the present embodiment, when HFC-32 is used together with HFO-1123, the content of HFC-32 in relation to 100 mass % of the working medium is, concretely, preferably 20 mass % or more, more preferably 20 to 80 mass %, and further preferably 40 to 60 mass %.

As for the working medium used in the present embodiment, for example, in the case where HFO-1123 is contained, preferable as HFO other than HFO-1123 are HFO-1234yf (GWP=4), HFO-1234ze(E), and HFO-1234ze(Z) ((GWP=6 in both HFO-1234ze(E) and HFO-1234(Z)), and more preferable are HFO-1234yf and HFO-1234ze(E), in terms of having a high critical temperature and being excellent in durability and coefficient of performance. As for HFO other than HFO-1123, one kind may be used independently, or two or more kinds may be used in combination. The content of HFO other than HFO-1123 in the working medium (100 mass %) can be selected arbitrarily in correspondence with a characteristic required of the working medium. For example, in the case of a working medium formed of HFO-1123 and HFO-1234yf or HFO-1234ze, a coefficient of performance improves when the content of HFO-1234yf or HFO-1234ze is within a range of 1 to 99 mass %.

A preferable composition range in the case where the working medium used in the present embodiment contains HFO-1123 and HFO-1234yf will be listed below as a composition range (S).

In each formula expressing the composition range (S), an abbreviated name of each chemical compound indicates a ratio (mass %) of that chemical compound in relation to the total amount of HFO-1123 and HFO-1234yf and other components (HFC-32 and so on).

<Composition Range (S)>

$$HFO\text{-}1123 + HFO\text{-}1234yf \geq 70 \text{ mass \%}$$

$$95 \text{ mass \%} \geq HFO\text{-}1123/(HFO\text{-}1123 + HFO\text{-}1234yf) \geq 35 \text{ mass \%}$$

The working medium of the composition range (S) is quite low in GWP and has a small temperature glide. Further, also in view of coefficient of performance, refrigerating capacity and critical temperature, the working medium of the composition range (S) can exhibit heat cycle performance capable of substituting conventional R410A.

In the working medium of the composition range (S), the ratio of HFO-1123 in relation to the total amount of HFO-1123 and HFO-1234yf is more preferably 40 to 95 mass %, further preferably 50 to 90 mass %, particularly preferably 50 to 85 mass %, and most preferably 60 to 85 mass %.

Further, the total content of HFO-1123 and HFO-1234yf in the working medium 100 mass % is more preferably 80 to 100 mass %, further preferably 90 to 100 mass %, and particularly preferably 95 to 100 mass %.

Further, it is preferable that the working medium used in the present embodiment contains HFO-1123, HFC-32, and HFO-1234yf, and a preferable composition range (P) in the case where HFO-1123, HFO-1234yf, and HFC-32 are contained will be listed below.

In each formula expressing the composition range (P), an abbreviated name of each chemical compound indicates a ratio (mass %) of that chemical compound in relation to the total amount of HFO-1123, HFO-1234yf, and HFC-32. The same applies to a composition range (R), a composition range (L), and a composition range (M). Further, in the composition range described below, it is preferable that the total amount of HFO-1123, HFO-1234yf, and HFC-32 described concretely is over 90 mass % and 100 mass % or less in relation to the whole amount of the working medium for heat cycle.

<Composition Range (P)>

$$70 \text{ mass \%} \leq HFO\text{-}1123 + HFO\text{-}1234yf$$

$$30 \text{ mass \%} \leq HFO\text{-}1123 \leq 80 \text{ mass \%}$$

$$0 \text{ mass \%} < HFO\text{-}1234yf \leq 40 \text{ mass \%}$$

$$0 \text{ mass \%} < HFC\text{-}32 \leq 30 \text{ mass \%}$$

$$HFO\text{-}1123/HFO\text{-}1234yf \leq 95/5 \text{ mass \%}$$

The working medium having the above composition is a working medium in which characteristics that HFO-1123, HFO-1234yf, and HFC-32 have respectively are exhibited in a balanced manner and defects that they have respectively are suppressed. In other words, this working medium is a working medium in which a GWP is suppressed to be quite low, and a temperature glide is small when used in a heat cycle, to thereby have certain capacity and efficiency, enabling good cycle performance. Here, it is preferable that the total amount of HFO-1123 and HFO-1234yf in relation to the total amount of HFO-1123, HFO-1234yf, and HFC-32 is 70 mass % or more.

Further, examples of more preferable composition of the working medium used in the present embodiment include a composition in which, in relation to the total amount of HFO-1123, HFO-1234yf, and HFC-32, HFO-1123 is contained at a ratio of 30 to 70 mass %, HFO-1234yf is contained at a ratio of 4 to 40 mass %, and HFC-32 is contained at a ratio of 0 to 30 mass %, and the content of HFO-1123 in relation to the whole amount of the working medium is 70 mol % or less. The working medium of the above-described range, in which the above-described effect is increased and in addition a self-decomposition reaction of HFO-1123 is suppressed, is a working medium with high durability. In view of relative coefficient of performance, the content of HFC-32 is preferably 5 mass % or more and more preferably 8 mass % or more.

Further, there will be listed another preferable composition in the case where the working medium used in the present embodiment contains HFO-1123, HFO-1234yf, and HFC-32. As long as the content of HFO-1123 in relation to the whole amount of the working medium is 70 mol % or less, a self-decomposition reaction of HFO-1123 is suppressed, so that a working medium with high durability can be obtained.

The further preferable composition range (R) will be listed below.

<Composition Range (R)>

10 mass %≤HFO-1123<70 mass %

0 mass %<HFO-1234yf≤50 mass %

30 mass %<HFC-32≤75 mass %

The working medium having the above composition is a working medium in which characteristics that HFO-1123, HFO-1234yf, and HFC-32 have respectively are exhibited in a balanced manner and defects that they have respectively are suppressed. In other words, this working medium is a working medium in which a GWP is suppressed to be low, durability is secured, and in addition, a temperature glide is small when used in a heat cycle, to thereby have high capacity and efficiency, enabling good cycle performance.

As for the working medium of the present embodiment which has the above-described composition range (R), a preferable range will be listed below.

20 mass %≤HFO-1123<70 mass %

0 mass %<HFO-1234yf≤40 mass %

30 mass %<HFC-32≤75 mass %

The working medium having the above-described composition is a working medium in which characteristics that HFO-1123, HFO-1234yf, and HFC-32 have respectively are exhibited in a balanced manner in particular and defects that they have respectively are suppressed. In other words, this working medium is a working medium in which a GWP is suppressed to be low, durability is secured, and in addition, a temperature glide is smaller when used in a heat cycle, to thereby have high capacity and efficiency, enabling good cycle performance.

As for the working medium of the present embodiment which has the above-described composition range (R), a more preferable range (L) will be listed below. A composition range (M) is further preferable.

<Composition Range (L)>

10 mass %≤HFO-1123<70 mass %

0 mass %<HFO-1234yf≤50 mass %

30 mass %<HFC-32≤44 mass %

<Composition Range (M)>

20 mass %≤HFO-1123<70 mass %

5 mass %≤HFO-1234yf≤40 mass %

30 mass %<HFC-32≤44 mass %

The working medium having the above-described composition range (M) is a working medium in which characteristics that HFO-1123, HFO-1234yf, and HFC-32 have respectively are exhibited in a balanced manner in particular and defects that they have respectively are suppressed. In other words, this working medium is a working medium in which an upper limit of the GWP is suppressed to be 300 or less, durability is secured, and in addition, a temperature glide is as small as less than 5.8 when used in a heat cycle, and a relative coefficient of performance and relative refrigerating capacity are close to 1 (one), enabling good cycle performance.

When the composition range is as described above, an upper limit of the temperature glide is lowered and a lower limit of relative coefficient of performance×relative cooling capacity is raised. In view of the fact that the relative coefficient of performance is large, 8 mass % HFO-1234yf is more preferable. Further, in view of the fact that the relative refrigerating capacity is large, HFO-1234yf 35 mass % is more preferable.

Further, another working medium used in the present embodiment preferably contains HFO-1123, HFC-134a, HFC-125, and HFO-1234yf, and this composition can suppress flammability of the working medium.

Further preferably, HFO-1123, HFC-134a, HFC-125, and HFO-1234yf are contained, a ratio of the total amount of HFO-1123, HFC-134a, HFC-125, and HFO-1234yf in relation to the whole amount of the working medium is over 90 mass % and 100 mass % or less, and in relation to the total amount of HFO-1123, HFC-134a, HFC-125, and HFO-1234yf, a ratio of HFO-1123 is 3 mass % or more and 35 mass % or less, a ratio of HFC-134a is 10 mass % or more and 53 mass % or less, a ratio of HFC-125 is 4 mass % or more and 50 mass % or less, and a ratio of HFO-1234yf is 5 mass % or more and 50 mass % or less. By making the working medium as above, the working medium is inflammable and excellent in safety, has smaller influence on the ozone layer and global warming, so that the working medium has better cycle performance when used in a heat cycle system.

Most preferably, HFO-1123, HFC-134a, HFC-125, and HFO-1234yf are contained, a ratio of the total amount of HFO-1123, HFC-134a, HFC-125, and HFO-1234yf in relation to the whole amount of the working medium is over 90 mass % and 100 mass % or less, and in relation to the total amount of HFO-1123, HFC-134a, HFC-125, and HFO-1234yf, a ratio of HFO-1123 is 6 mass % or more and 25 mass % or less, a ratio of HFC-134a is 20 mass % or more and 35 mass % or less, a ratio of HFC-125 is 8 mass % or more and 30 mass % or less, and a ratio of HFO-1234yf is 20 mass % or more and 50 mass % or less. By making the working medium be as described above, the working medium is inflammable and still excellent in safety, has still smaller influence on the ozone layer and global warming, so that the working medium has still better cycle performance when used in a heat cycle system.

(Other Arbitrary Components)

The working medium used in the composition for heat cycle system of the present embodiment may contain, other than the above-described arbitrary components, carbon dioxide, hydrocarbon, chlorofluoroolefin (CFO), hydrochlorofluoroolefin (HCFO), and so on. As the other arbitrary components, components which have small influence on the ozone layer and have small influence on global warming are preferable.

Examples of hydrocarbon include propane, propylene, cyclopropane, butane, isobutane, pentane, isopentane and so on.

As for hydrocarbon, one kind may be used independently, or two or more kinds may be used in combination.

When the above-described working medium contains hydrocarbon, its content is less than 10 mass % in relation to 100 mass % of the working medium, preferably 1 to 5 mass %, and further preferably 3 to 5 mass %. When the content of hydrocarbon is equal to or more than a lower limit value, solubility of a mineral-based refrigerant oil to the working medium becomes better.

Examples of CFO include chlorofluoropropene, chlorofluoroethylene and so on. In terms of easily suppressing the flammability of the working medium without greatly decreasing the cycle performance of the working medium, 1,1-dichloro-2,3,3,3-tetrafluoropropene (CFO-1214ya), 1,3-dichloro-1,2,3,3-tetrafluoropropene (CFO-1214yb), and 1,2-dichloro-1,2-difluoroethylene (CFO-1112) are preferable as CFO.

As for CFO, one kind may be used independently, or two or more kinds may be used in combination.

When the working medium contains CFO, its content is less than 10 mass % in relation to 100 mass % of the working medium, preferably 1 to 8 mass %, and further preferably 2 to 5 mass %. When the content of CFO is equal to or more than a lower limit value, the flammability of the working medium is easily suppressed. When the content of CFO is equal to or less than an upper limit value, excellent cycle performance is easily obtained.

Examples of HCFO include hydrochlorofluoropropene, hydrochlorofluoroethylene, and so on. In terms of easily suppressing the flammability of the working medium without greatly decreasing the cycle performance of the working medium, 1-chloro-2,3,3,3-tetrafluoropropene (HCFO-1224yd) and 1-chloro-1,2-difluoroethylene (HCFO-1122) are preferable as HCFO.

As for HCFO, one kind may be used independently, or two or more kinds may be used in combination.

When the above-described working medium contains HCFO, a content of HCFO in the working medium 100 mass % is less than 10 mass %, preferably 1 to 8 mass %, and further preferably 2 to 5 mass %. When the content of HCFO is equal to or more than a lower limit value, the flammability of the working medium is easily suppressed. When the content of HCFO is equal to or less than upper limit value, excellent cycle performance is easily obtained.

When the working medium used in the present embodiment contains the other arbitrary components as described above, the total content of the other arbitrary components in the working medium is less than 10 mass % in relation to 100 mass % of the working medium, preferably 8 mass % or less, and further preferably 5 mass % or less.

<Configuration of Heat Cycle System>

Next, a schematic configuration of the heat cycle system according to the present embodiment will be described.

Figure 1:
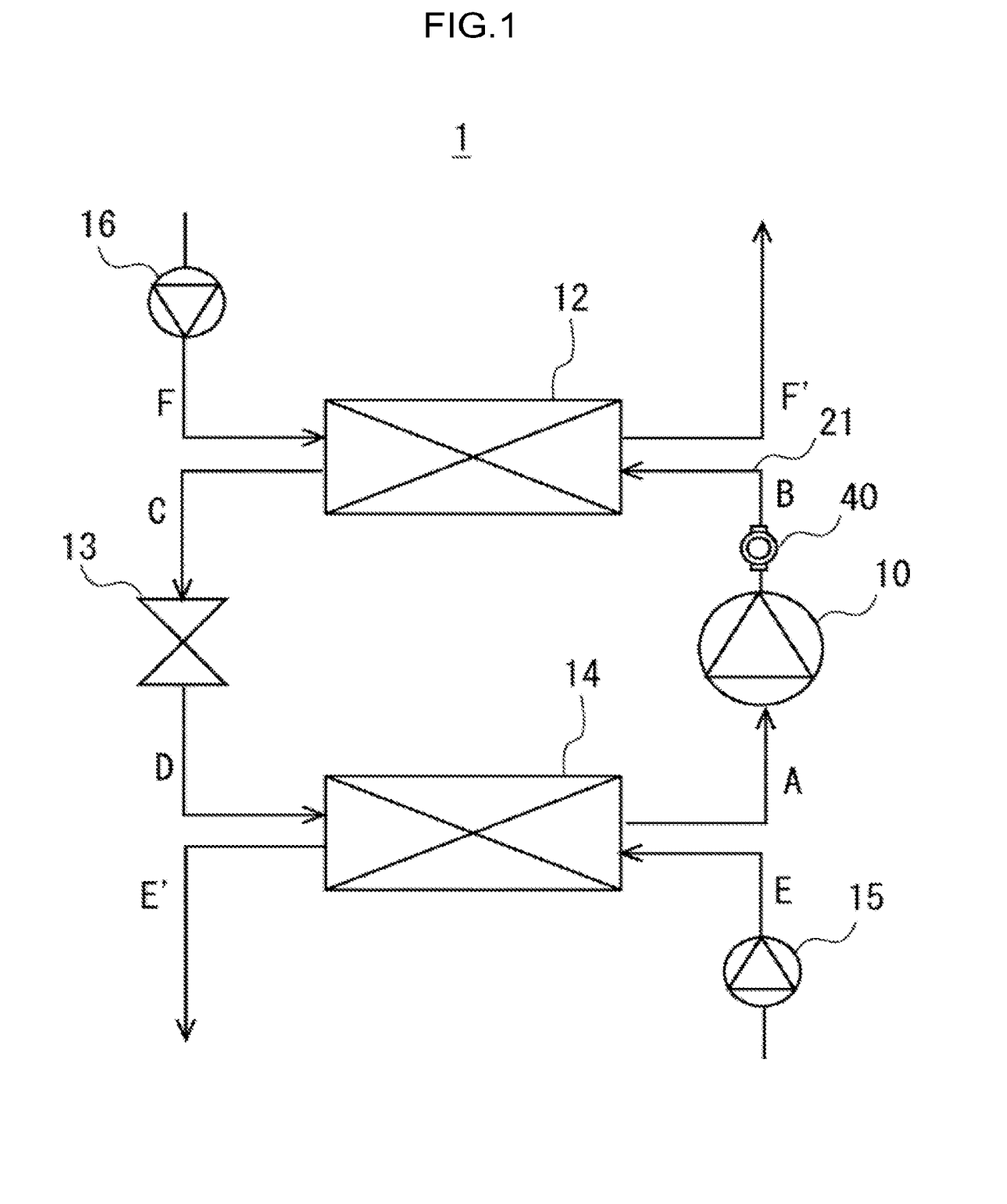
FIG. 1 is a schematic configuration diagram illustrating an example of a heat cycle system according to the present embodiment.

FIG. 1 is a view illustrating a schematic configuration of a heat cycle system 1 according to the present embodiment. The heat cycle system 1 has a compressor 10, a high-pressure side heat exchanger 12, an expansion mechanism 13, and a low-pressure side heat exchanger 14. The compressor 10 compresses a working medium (vapor). The high-pressure side heat exchanger 12 cools and liquefies the working medium vapor emitted from the compressor 10. The expansion mechanism 13 expands the working medium (liquid) emitted from the high-pressure side heat exchanger 12. The low-pressure side heat exchanger 14 heats and vaporizes the working medium (liquid) emitted from the expansion mechanism 13. The low-pressure side heat exchanger 14 and the high-pressure side heat exchanger 12 are configured to perform heat exchange between the working medium and a heat source fluid that flows oppositely or in parallel. The heat cycle system 1 has a fluid supply means 15 supplying the low-pressure side heat exchanger 14 with a heat source fluid E such as water and air, and a fluid supply means 16 supplying the high-pressure side heat exchanger 12 with a heat source fluid F such as water and air. Further, the heat cycle system 1 is provided with an acid detection means 40 detecting acid generated by decomposition of the working medium in the heat cycle, in a discharge pipe 21 being a pipe connecting the compressor 10 and the high-pressure side heat exchanger 12. Details of the acid detection means 40 will be described later.

In the heat cycle system 1, the following heat cycle is repeated. First, the working medium vapor A emitted from the low-pressure side heat exchanger 14 is compressed in the compressor 10 to be made into working medium vapor B of high temperature and high pressure. Then, the working medium vapor B emitted from the compressor 10 is cooled and liquefied by the fluid F in the high-pressure side heat exchanger 12 to be made into working medium liquid C. In this event, the fluid F is heated to be made into fluid F' and emitted from the high-pressure side heat exchanger 12. Subsequently, the working medium liquid C emitted from the high-pressure side heat exchanger 12 is expanded in the expansion mechanism 13 to be made into working medium liquid D of low temperature and low pressure. Subsequently, the working medium liquid D emitted from the expansion mechanism 13 is heated by the fluid E in the low-pressure side heat exchanger 14 to be made into the working medium vapor A. In this event, the fluid E is cooled to be made into fluid E' and emitted from the low-pressure side heat exchanger 14.

Figure 2:
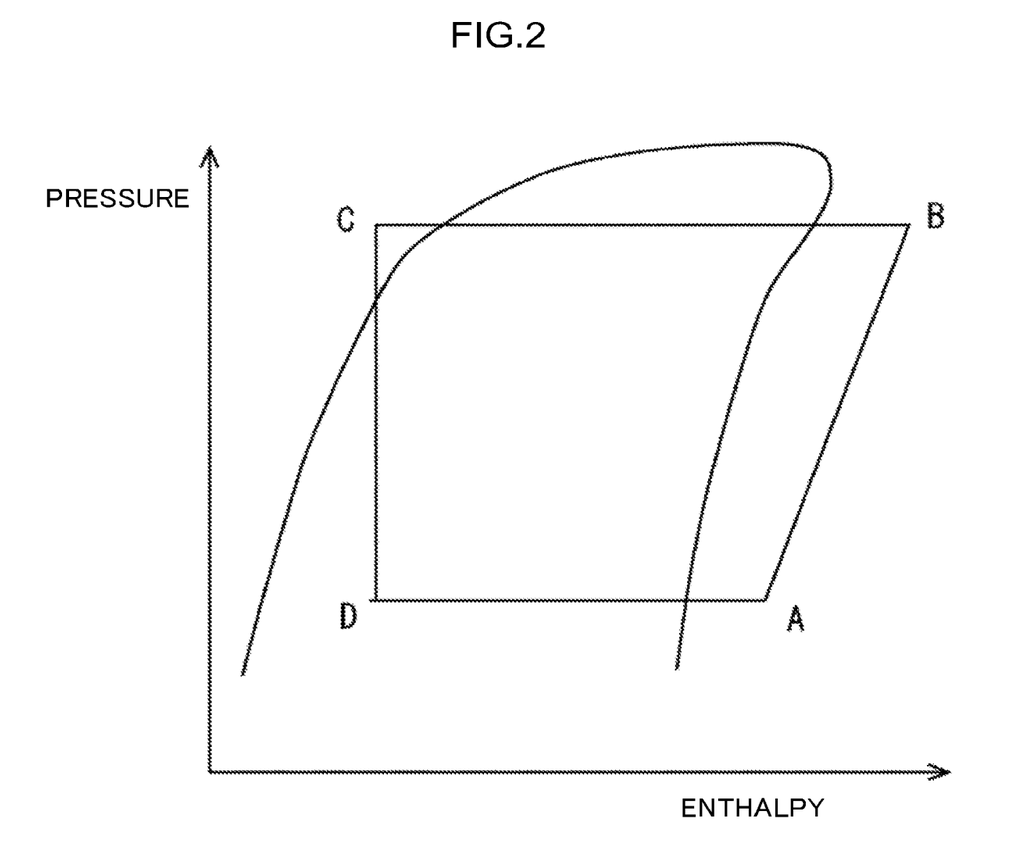
FIG. 2 is a pressure-enthalpy line diagram illustrating change of state of a working medium of the heat cycle system according to the present embodiment.

FIG. 2 is a pressure-enthalpy line diagram illustrating change of state of the working medium of the heat cycle system 1. As illustrated in FIG. 2, in a process of the change of state from A to B, adiabatic compression is performed in the compressor 10 to make the working medium vapor A of low temperature and low pressure into the working medium vapor B of high temperature and high pressure. In a process of the change of state from B to C, isobaric cooling is performed in the high-pressure side heat exchanger 12 to make the working medium vapor B into the working medium C. In a process of the change of state from C to D, isoenthalpic expansion is performed in the expansion mechanism 13 to make the working medium C of high temperature and high pressure into the working medium D of low temperature and low pressure. In a process of the change of state from D to A, isobaric heating is performed in the low-pressure side heat exchanger 14 to return the working medium D to the working medium vapor A.

Next, there will be explained decomposition of HFO which becomes a problem when the working medium containing HFO is used as the working medium. Note that FIG. 1 is appropriately referred to in the following explanation.

HFO is highly possible to be decomposed to generate a decomposition product such as acid exemplified by hydrogen fluoride (HF), formic acid, and acetic acid, and carbon, when exposed under a high-temperature high-pressure environment or when air and water get mixed therein. The acid generated by decomposition of HFO corrodes a metal component in the heat cycle, becomes an inorganic sludge of metallic salt, the acid itself becoming a catalyst to promote decomposition of HFO. Further, in the heat cycle, when the sludge is generated, the sludge clogs the pressure reducing mechanism (expansion mechanism 13) to raise the pressure of the working medium after being compressed in the compressor 10 (high compression ratio operation), thereby damaging reliability of the compressor 10.

Further, in the heat cycle system 1, for example, in the case where the working medium containing HFO-1123 being one of HFO is used, it becomes highly possible that disproportionation of HFO-1123 occurs when the sludge generated by decomposition of HFO-1123 clogs the expansion mechanism 13, raising a discharge pressure to bring about high compression ratio operation. The disproportionation is a chain chemical reaction accompanied by heat generation which occurs when local energy is applied under a high temperature or a high pressure.

Under the circumstances, when HFO is used as the working medium in the heat cycle system 1, it is necessary to appropriately detect occurrence of decomposition of the working medium in the heat cycle.

Here, details of the acid detection means 40 will be described.

As described above, when HFO being the working medium is decomposed, acid such as HF is generated. In the heat cycle system 1 illustrated in FIG. 1, a place where decomposition of the working medium is considered to be likely to occur is the compressor 10 in which the working medium comes to have the highest temperature and the highest pressure during operation. Thus, in the heat cycle system 1, the acid detection means 40 detecting acid such as HF which is generated by decomposition of the working medium is provided in the discharge pipe 21 proximate to the compressor 10. If the discharge pipe 21 has a trap portion, the acid detection means 40 may be provided in the trap portion of the discharge pipe 21. Since a decomposition product generated by decomposition of the working medium is captured in the trap portion, occurrence of decomposition of the working medium in the heat cycle can be detected more appropriately by providing the acid detection means 40 in the trap portion of the discharge pipe 21.

Figure 3:
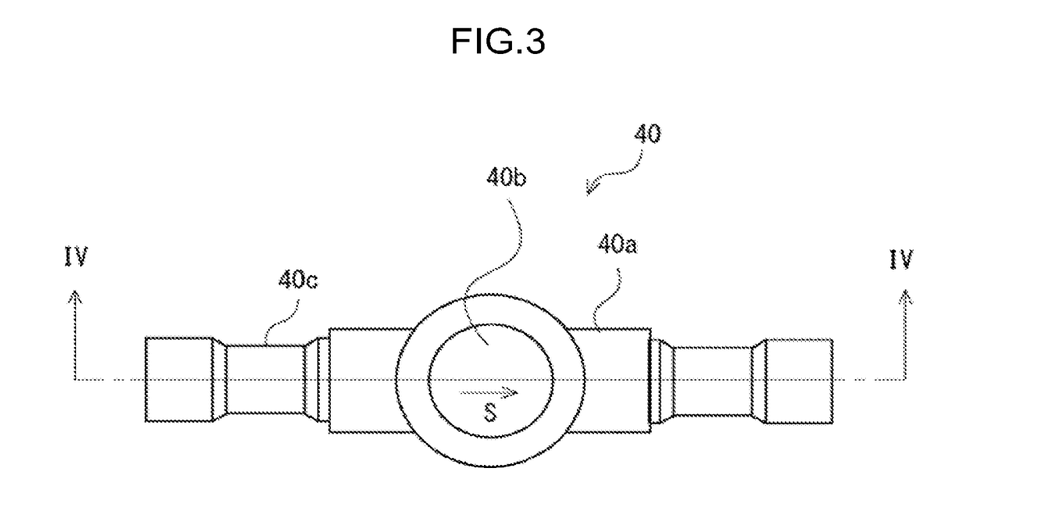
FIG. 3 is a plan view illustrating a schematic configuration of an acid detection means in the heat cycle system according to the present embodiment.
Figure 4:
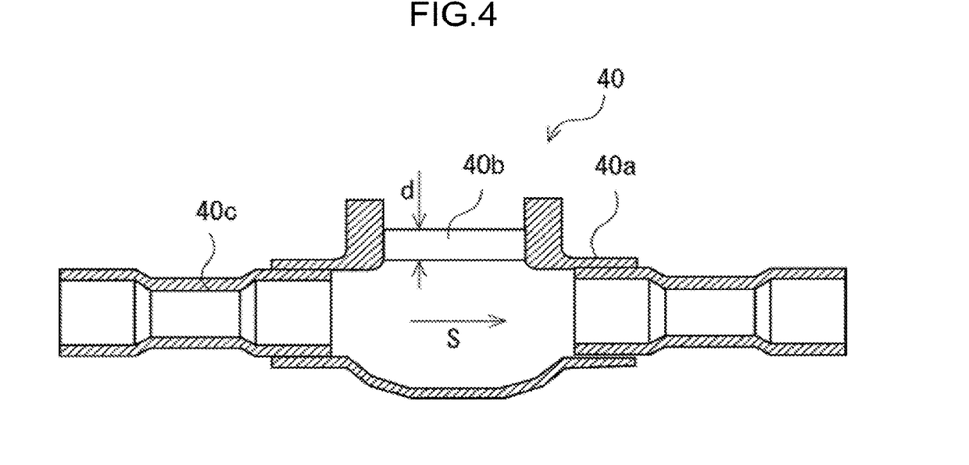
FIG. 4 is a cross-sectional view along a line IV-IV of FIG. 3.

In the present embodiment, the acid detection means 40 comprises a sight glass which enables viewing a state of the working medium such as distribution, cessation, a flow speed, and a flow amount of the working medium led in a path of the pipe. FIG. 3 is a plan view illustrating a schematic configuration of the acid detection means 40. FIG. 4 is a cross-sectional view along a line IV-IV of FIG. 3. Note that an arrow S in the drawing indicates a flow direction of the working medium. As illustrated in FIG. 3 and FIG. 4, the acid detection means 40 has a main body 40*a*, an observation window 40*b*, and a pipe section 40*c*. The main body 40*a* is hollow and has, in its inside, a flow path through which the working medium passes. The observation window 40*b* is to observe the working medium passing inside the discharge pipe 21. In other words, the observation window 40*b* is provided in a part of the main body 40*a* and enables viewing the inside of the main body 40*a*. The pipe section 40*c* is to connect the discharge pipe 21 and the main body 40*a*.

The main body 40*a* is constituted by a metal material, for example. The observation window 40*b* is formed of a transparent material which is to be colored by existence of acid, that is, glass or the like, for example. In FIG. 3 and FIG. 4, a shape of the observation window 40*b* is a disk shape, but the shape is not limited thereto as long as being planar, and the observation window 40*b* may be a plate of polygon such as a rectangle, for example. The pipe section 40*c* is formed of a metal material, for example. The pipe section 40*c* may be constituted integrally with the main body 40*a*, and may be constituted as a separate body. It suffices that the pipe section 40*c* and the discharge pipe 21 (see FIG. 1) can be connected to make the inside thereof have a sealed structure, and may be connected by flare or may be connected by brazing.

Figure 5:
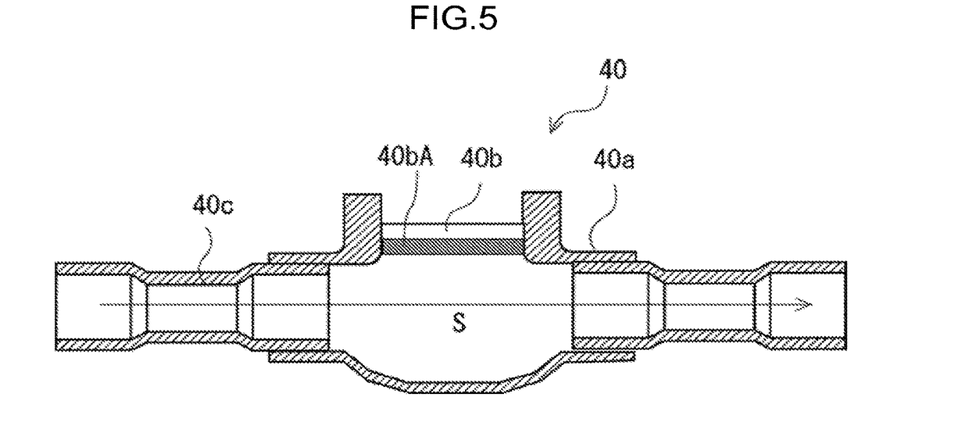
FIG. 5 is a cross-sectional view illustrating a state of the acid detection means at a time of occurrence of decomposition of the working medium.

FIG. 5 is a cross-sectional view illustrating a state of the acid detection means 40 at a time of occurrence of decomposition of the working medium. As illustrated in FIG. 5, when decomposition of the working medium occurs and acid such as HF is contained in the working medium, a part 40*b*A of the observation window 40*b* which is in contact with the working medium is corroded and discolored. Therefore, by viewing the observation window 40*b*, it is possible to easily confirm that decomposition of the working medium has occurred in the heat cycle. Thereby, occurrence of decomposition of the working medium in the heat cycle can be appropriately detected when the working medium containing HFO is used.

As described above, in the heat cycle system 1 illustrated in FIG. 1, the place where decomposition of the working medium is considered to be likely to occur is the discharge pipe 21 in which the working medium comes to have the high temperature and the high pressure. When decomposition of the working medium occurs, a concentration of the acid contained in the working medium becomes highest in the place where decomposition of the working medium has occurred. Therefore, if the acid detection means 40 is provided in a place of low temperature and low pressure in the heat cycle system 1, for example, occurrence of decomposition of the working medium cannot be detected appropriately. Further, it is considered that the inside of the compressor 10, where the working medium comes to have the high temperature and the high pressure, is a place in which decomposition of the working medium is likely to occur, but the acid detection means 40 is hard to be disposed therein because of an installation space or the like. Therefore, in order to detect occurrence of decomposition of the working medium appropriately, the acid detection means 40 is desired to be provided in the discharge pipe 21.

A thickness (plate thickness) d of the observation window 40*b* illustrated in FIG. 4 is preferably larger than a thickness d1 necessary for maintaining pressure resistance performance (d>d1). In the case where the thickness d of the observation window 40*b* is the thickness d1 necessary and sufficient for maintaining the pressure resistance performance (d=d1), there is a possibility that the pressure resistance performance becomes insufficient when the part of the observation window 40*b* which is in contact with the working medium is corroded by the acid such as HF generated by decomposition. By making the thickness d of the observation window 40*b* larger than the thickness d1 necessary and sufficient for maintaining the pressure resistance performance, the pressure resistance performance can be maintained sufficiently even if the part of the observation window 40*b* which is in contact with the working medium is corroded.

By providing a camera to monitor the observation window 40*b* and a determination means determining a degree of coloring from an image of the observation window 40*b* which is photographed by the camera, the decomposition state of the working medium can be automatically detected. In this case, it is possible to determine whether or not decomposition of the working medium has occurred in the heat cycle system by comparing the coloring degree obtained from the image of the observation window 40 and a predetermined threshold value (coloring threshold value). In other words, when the detected coloring degree exceeds the coloring threshold value, it is determined that acid has been generated by decomposition of the working medium, and when the detected coloring degree is equal to or less than the coloring threshold value, it is determined that acid has not been generated by decomposition of the working medium.

Modification Example

Figure 6:
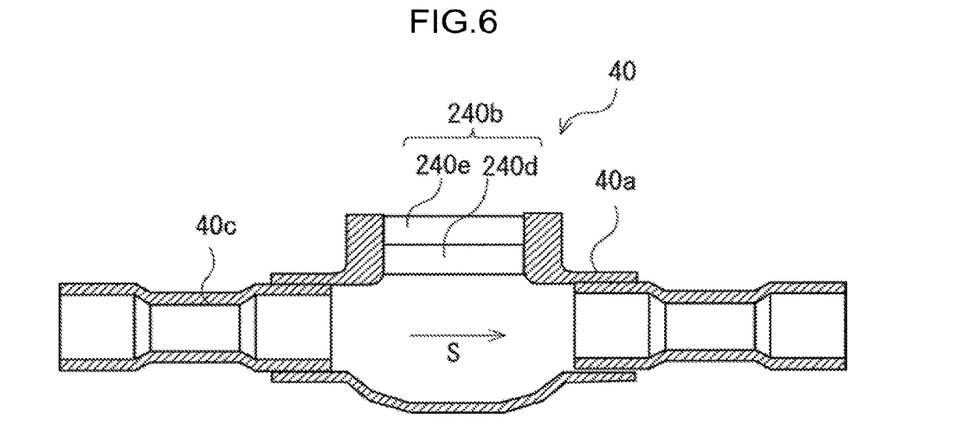
FIG. 6 is a cross-sectional view illustrating a modification example of the acid detecting means in the heat cycle system according to the present embodiment.

FIG. 6 is a cross-sectional view illustrating a modification example of the acid detection means 40. As illustrated in FIG. 6, as for an observation window 240*b*, a surface 240*d* on a side to be in contact with a working medium may be formed of glass, while a surface 240*e* on an opposite side to the side to be in contact with the working medium may be formed of an acid-resistant transparent member. The acid-resistant transparent member 240*e* is an acrylic resin, for example. By making the observation window 240*b* have a double structure of glass and acid-resistant transparent member as above, corrosion can be prevented from progressing from a predetermined part by the acid-resistant transparent member 240*e* even if the part of the observation window 240*b* which is in contact with the working medium is corroded. By providing the acid-resistant transparent member 240*e* in a manner to sufficiently maintain pressure resistance performance by itself, it is also possible to secure safety sufficiently.

Reference Embodiment

Hereinafter, a reference embodiment related to the present embodiment will be described with reference to the drawings. Note that a component practically the same as that of the above-described present embodiment is given the same reference numeral, and explanation thereof will be omitted.

Figure 7:
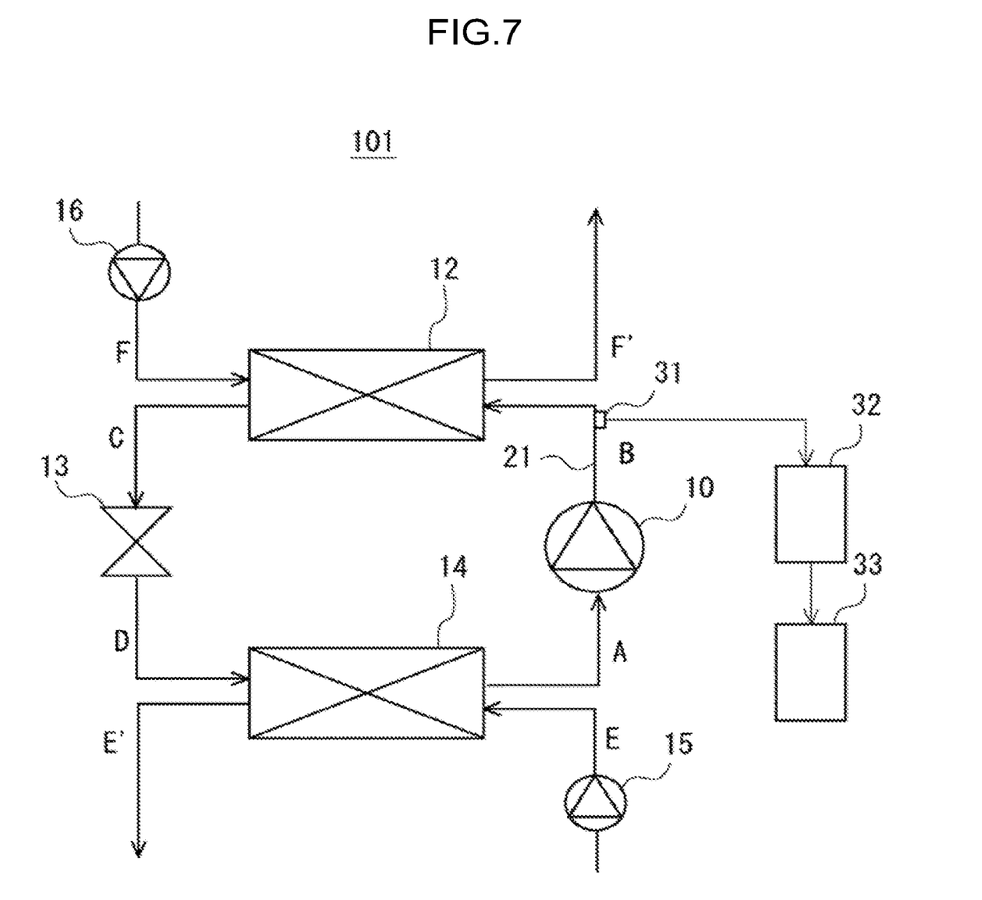
FIG. 7 is a diagram illustrating a schematic configuration of a heat cycle system according to a reference embodiment related to the present invention.

A working medium used in a heat cycle system according to this reference embodiment is a working medium containing HFO which is described in the above-described present embodiment. A schematic configuration of the heat cycle system according to this reference embodiment is basically the same as one described by using FIG. 1 in the above-described present embodiment. FIG. 7 is a diagram illustrating a schematic configuration of a heat cycle system 101 according to this reference embodiment. As illustrated in FIG. 7, the heat cycle system 101 according to this reference embodiment includes a discharge temperature sensor 31, a determination section 32, and a display section 33, instead of the acid detection means 40 (see FIG. 1).

The discharge temperature sensor 31 is to detect a temperature (discharge temperature) of the working medium discharged from a compressor 10, and is provided in a discharge pipe 21. It is known that the discharge temperature rises rapidly when decomposition of the working medium occurs in the heat cycle system 1. Therefore, based on the discharge temperature detected by the discharge temperature sensor 31, it is possible to detect that decomposition of the working medium has occurred in the heat cycle and indirectly detect that acid has been generated.

The determination section 32 determines whether or not decomposition of the working medium has occurred in the heat cycle based on the discharge temperature detected by the discharge temperature sensor 31. More specifically, the determination section 32 determines whether or not decomposition of the working medium has occurred in the heat cycle by comparing the discharge temperature detected by the discharge temperature sensor 31 and a predetermined threshold value (discharge temperature threshold value).

In other words, when the discharge temperature detected by the discharge temperature sensor 31 exceeds the discharge temperature threshold value, the determination section 32 determines that decomposition of the working medium has occurred in the heat cycle, and when the discharge temperature detected by the discharge temperature sensor 31 is equal to or less than the discharge temperature threshold value, the determination section 32 determines that decomposition of the working medium has not occurred in the heat cycle. The discharge temperature threshold value may be set to be a temperature obtained by adding a predetermined temperature (for example, 50° C.) to a discharge temperature at a time of steady operation, and may be set at 210° C. being a tolerance value of a winding of E-type insulation.

The display section 33 is to display that decomposition of the working medium has occurred in the heat cycle when the occurrence has been determined by the judgment section 32. Note that the display section 33 may be provided in an operation means performing driving operation of the heat cycle system 1 or may be provided as a monitor itself for checking a driving status or a part thereof.

It is known that a pressure (discharge pressure) of the working medium discharged from the compressor 10 also rises rapidly together with the discharge temperature when decomposition of the working medium occurs in the heat cycle system 1.

Therefore, by configuring the determination section 32 to detect occurrence of decomposition of the working medium in the heat cycle based on the detected discharge pressure, determination based on the pressure is also possible. More specifically, the determination section 32 determines whether or not acid has been generated by decomposition of the working medium by comparing the detected discharge pressure and a predetermined threshold value (discharge pressure threshold value). In other words, when the detected discharge pressure exceeds the discharge pressure threshold value, the determination section 32 determines that acid has been generated by decomposition of the working medium, and when the detected discharge pressure is equal to or less than the discharge pressure threshold value, the determination section 32 determines that acid has not been generated by decomposition of the working medium. The discharge pressure may be detected by estimating from the temperature detected by the discharge temperature sensor 31 or a temperature of each section, or may be directly detected by providing a discharge pressure sensor in the discharge pipe 21.

As described above, according also to this reference embodiment, it is possible to appropriately detect that decomposition of the working medium has occurred in the heat cycle when the working medium containing HFO is used.

The present invention is not limited to the above-described embodiments and modification can be made within a range not departing from the gist thereof.

What is claimed is:

1. A heat cycle system, comprising a working medium containing hydrofluoroolefin (HFO), the heat cycle system comprising:
   a compressor;
   a high-pressure side heat exchanger;
   a low-pressure side heat exchanger;
   an expansion mechanism; and
   an acid detector to detect acid generated by decomposition of the working medium, the acid detector being provided in a discharge pipe connecting the compressor and the high-pressure side heat exchanger,
   wherein the acid detector comprises a sight glass having an observation window to observe the working medium passing inside the discharge pipe,
   wherein the observation window has a double structure, wherein in the observation window, at least a surface on a side to be in contact with the working medium is formed of glass, wherein a surface of the glass is colored by the presence of acid, and a surface on an opposite side to the side to be in contact with the working medium is formed of an acid-resistant transparent member.

2. The heat cycle system according to claim 1, wherein the observation window is formed to have a larger thickness than a thickness necessary to maintain pressure resistance performance.

3. The heat cycle system according to claim 1, wherein the sight glass is provided in a trap portion of the discharge pipe.

4. The heat cycle system according to claim 1, wherein the HFO contains 1,1,2-trifluoroethylene.

5. The heat cycle system according to claim 1, wherein the acid-resistant transparent member is an acrylic resin.

* * * * *